No. 791,190. PATENTED MAY 30, 1905.
L. HANSON.
GATE.
APPLICATION FILED FEB. 21, 1905.
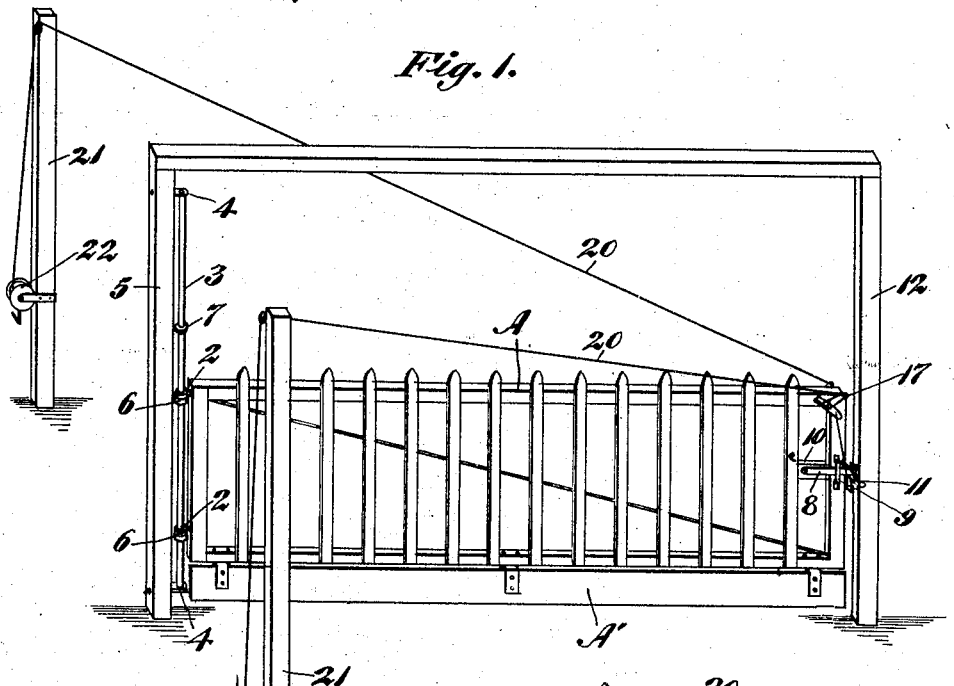
Fig. 1.
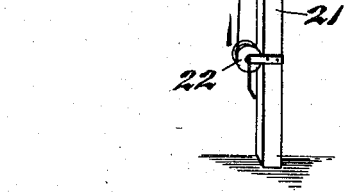
Fig. 2.
Fig. 3.
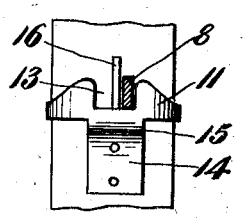
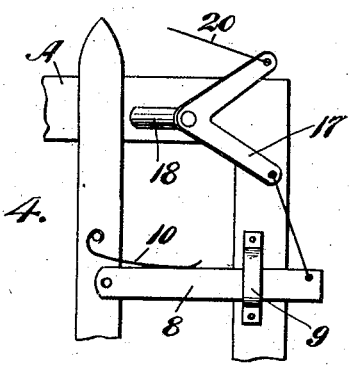
Fig. 4.
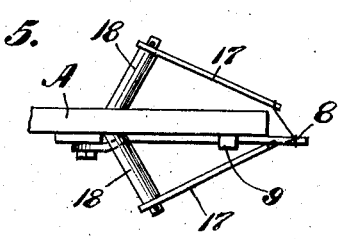
Fig. 5.
Witnesses,
Chas. E. Chapin.
Inventor,
Louis Hanson
By Geo. H. Strong No. 791,190. Patented May 30, 1905.

UNITED STATES PATENT OFFICE.

LOUIS HANSON, OF COTTONWOOD, IDAHO.

GATE.

SPECIFICATION forming part of Letters Patent No. 791,190, dated May 30, 1905.

Application filed February 21, 1905. Serial No. 246,735.

*To all whom it may concern:*

Be it known that I, LOUIS HANSON, a citizen of the United States, residing at Cottonwood, in the county of Idaho and State of Idaho, have invented new and useful Improvements in Gates, of which the following is a specification.

My invention relates to improvements in gates.

It consists in combinations of mechanism and details of construction which will be more fully explained by reference to the accompanying drawings, in which—

Figure 1 is a side view of my gate. Figs. 2 and 3 are enlarged views of latch. Figs. 4 and 5 are enlarged views of latch-raising mechanism.

It is the object of my invention to provide certain improvements in hinged swinging gates, by which improvement the gate may be raised or lowered and means provided to adjust it to swing free of snow or other impediment. A suitable latch is provided and means for operating said latch from either side, so that the driver may open and close the gate without leaving his vehicle.

The gate A is here shown as having hinges at 2 which are turnable upon a vertical inner post 3. This post 3 is here shown as being cylindrical, and its upper and lower ends may be made square or otherwise shaped and fixed in sockets 4 at top and bottom. These socket-pieces are in turn secured to a post 5, set deep enough in the ground and braced, if required, to form a suitable rigid part, from which the gate may be suspended. The hinges 2 turn loosely upon the vertical bar 3, and the gate may be raised or lowered by sliding these hinges. Below the hinges are the collars 6, which may be fixed by set-screws or otherwise to support the gate at any desired height, so as to clear the ground of snow or any obstruction which may be lodged or deposited there. Above one of the hinges of the gate is fixed another collar, 7, between which and the collar 6 the hinge is turnable, and this upper collar prevents the gate from being lifted so as to disengage the latch when not desired. The latch 8 is here shown pivoted to the gate and movable in a guide 9, and a spring 10 acts to normally hold the latch down.

11 is the catch upon the gate-post 12, which post is fixed in the ground at the proper point and corresponding with the hinge gate-post 4. This catch has a notch 13 in the center, and it is set out from the gate-post a sufficient distance to allow the latch to move freely and engage the notch. From each side of the notch the upper edges of the catch decline and are curved outward, as shown, to clasp the sides of the gate-post. From the bottom of the catch a plate 14 extends downward and is provided with means for securing it firmly to the gate-post. The upper part of this extension has an offset, as shown at 15, which allows the catch to be set out from the post, as before described. Midway of the notch in the catch is an upwardly-extending stop 16, sufficiently higher than the upper edges of the catch to prevent the latch from passing the notch when the gate is closed, but not so much higher as to prevent the latch being lifted sufficiently to clear it when the gate is to be opened toward the opposite side.

In order to open the gate, I have shown two bell-crank levers 17, having the angles fulcrumed upon stout pins 18, which are fixed and stand at an angle upon each side and near the top of the free edge of the gate. The lower angle of each bell-crank lever is connected by a chain, cord, or wire with the movable end of the latch. The other arms of the levers are connected by a chain or cord 20, which extends to the top of the post 21, and passing over a pulley or through a guide-opening the cord passes down to a winding-drum 22, fixed at convenient height upon the side of the post and having a crank by which it is turnable. By turning this crank and winding the cord the latter will act upon the bell-crank lever and through it raise the latch and disengage it from the catch, so that the gate may swing open. Having passed through the gate, it is only necessary for the driver to wind up the cord upon the drum, which is located upon a post on the opposite side of the gate-opening, and the gate will then be closed, the central stop in either case insuring the latch engaging the catch properly.

The flexible cord or connection by which the latch is operated is carried up sufficiently high to allow of any desired load to pass beneath it, and if the driver be upon a high load he can reach the cord and open the gate without recourse to the winding-drum.

The lower edge of the gate has a hinged swinging section A', which is designed to close the space between the bottom of the gate and the ground, but at the same time to swing freely when the gate is opened, so that in case of snow or other deposit which would otherwise prevent the opening of the gate this swinging portion would allow the gate to move without obstruction.

Having thus described my invention, what I claim, and desire to secure by Letters Patent, is—

1. A gate having the hinges, and the posts upon which they are turnable, in combination with a catch having a central notch fixed to the outer gate-post, a spring-pressed latch pivoted to the gate, bell-crank levers having their angles pivoted to the gate, a flexible connection from one arm of each lever to the latch and a flexible connection extending from the opposite arm of each lever whereby the latch may be lifted.

2. The combination in a gate of permanent posts fixed at opposite sides of the gate-opening, a vertical cylindrical bar fixed to one of said posts having adjustable collars between which the hinges of the gate are turnable, a spring-pressed latch at the opposite end of the gate, and a catch and stop carried by the permanent post at that side, angularly-arranged pins and bell-crank levers mounted thereon and angularly fulcrumed to opposite sides of the top of the gate said levers having flexible connections between one of the arms and the gate-latch and flexible connections with the other arms of the levers, posts fixed at a distance upon each side of the gate having guide openings or pulleys at the top and winding-drums with cranks fixed to said posts adapted to wind the cord and raise the latch and swing the gate open from one side and to close the gate from the opposite side.

In testimony whereof I have hereunto set my hand in presence of two subscribing witnesses.

LOUIS HANSON.

Witnesses:
POWELL GIBSON,
ALBERT BARTH.